Aug. 11, 1931.  A. L. DRAGER  1,818,794
AUTOMOBILE TIRE CHAIN
Filed Jan. 16, 1931
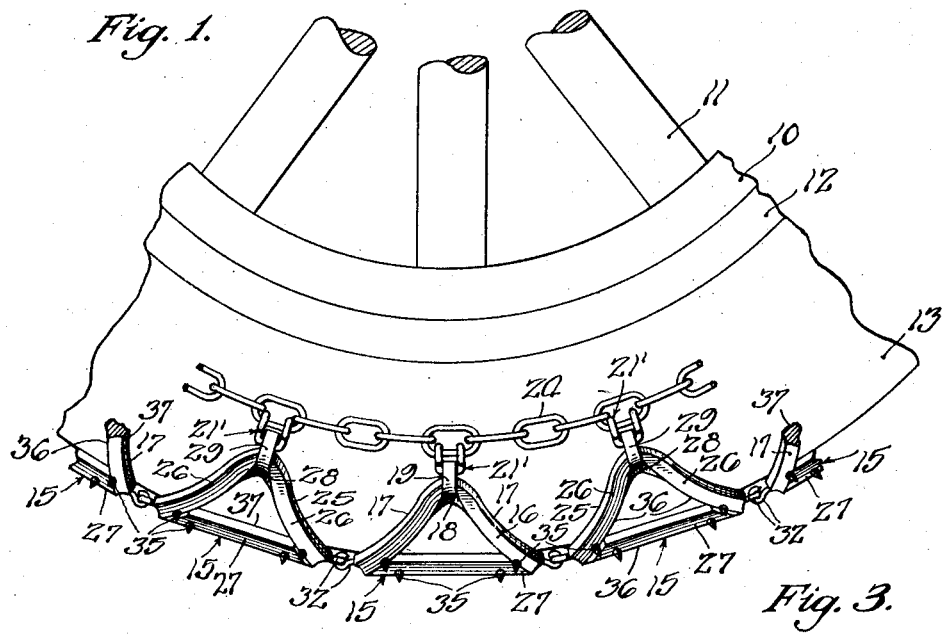

Patented Aug. 11, 1931

1,818,794

UNITED STATES PATENT OFFICE

AMIL L. DRAGER, OF BELOIT, WISCONSIN

AUTOMOBILE TIRE CHAIN

Application filed January 16, 1931. Serial No. 509,215.

This invention relates to certain novel improvements in automobile tire chains, and has for its principal object the provision of an improved construction of this character which will be highly efficient in use and economical in manufacture.

The salient object of this invention is to provide an improved chain for automobile tires and, more particularly, to provide a chain which will prevent slipping of the tires on icy pavements.

Another object of the invention is to provide a chain which will not, in use, injure the tire and which will conform to the shape of the tire when the tire becomes deflated as in the case of a puncture, leak, or blowout.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a fragmentary side elevational view of a typical automotive vehicle wheel and tire showing a preferred form of construction of the invention associated therewith;

Fig. 2 is a fragmentary plan view of the invention as depicted in Fig. 1;

Fig. 3 is a transverse sectional view of the wheel, tire and chain construction as depicted in Figs. 1 and 2;

Fig. 4 is an end elevational view of one unit of the chain construction; and

Fig. 5 is a detail view of a preferred manner of mounting the calks in the chain construction.

Referring to the drawings wherein a preferred embodiment of the invention is depicted, indicated at 10 is the felloe construction of an automotive vehicle wheel, with which are associated the spokes 11, rim 12, tire 13 of which the tread is indicated at 13a, and inner tube 14, all of which may be of any approved construction since the same form no part of the present invention.

The present invention includes a plurality of interconnected sections generically indicated at 15, and since these sections are exactly similar in construction, the construction of one section will be described in detail, and the manner of interconnecting these sections.

Each of these sections 15 includes a substantially V-shaped element 16 that includes arms 17 joined at the bight portion 18. A boss 19 depends from the bight portion 18 and extended through an opening 20 in the boss 19 is the bight portion 21 of a U-shaped member 21' that includes arms 22 having hooked portions 23 at their ends, and the links 24 of a chain are engaged by these hooked portions 23. Each section 15 includes a substantially triangular element generically indicated at 25 and each element 25 includes a pair of arms 26 between which extends a bar 27, the arms 26 being interconnected at the ends opposite the bar 27, as indicated at 28. A boss 29, similar to the boss 19, depends from the portion 28 and one of the members 21' is associated with each of the bosses 29 so as to connect the elements 25 to the chain links 24.

The arms 17 include reduced inner end portions 30, and a lug 31 is provided on each end of the bar 27. Interconnecting the lugs 31 and the reduced end portions 30 of the arms 17 are eyebolts 32, it thus being apparent that each element 16 and the corresponding element 25 are pivoted about the eyebolts 32, as best shown in Fig. 2.

In the outer periphery of the elements 16 and 25, as best shown in Fig. 5, for the arm 17 of element 16, are provided threaded recesses 33 and the threaded shanks 34 of calks 35 are detachably mounted in these recesses, the calks 35 being of any approved type but preferably of the hard steel core and soft iron shell type.

As shown in Fig. 2, the eyebolts 32 have the looped portions thereof interlocked so as to connect the members 15 together.

Suitable clamping and tensioning means may be provided in the chains 34 and a suitable clamping structure may be provided between two of the eyebolts 32 so as to facilitate mounting the chain structure on a tire. In use, when my improved chain structure is mounted on the tires of an automotive vehicle, the vehicle will be prevented from skidding on icy pavements by reason of the arrangement of the calks disposed in the elements 16 and 25 of each section 15. To enhance the gripping action of the elements 16 and 25, the outer edges thereof are beveled to a relatively sharp edge, as indicated at 36, Figs. 2, 4 and 5.

When the weight of the vehicle is disposed on one of the sections 15, during motion of the vehicle, the elements 16 and 25 will flex inwardly at the eyebolts 32 and thereby maintain a relatively wide gripping surface in contact with the surface over which the vehicle is moving, this flexing action tending to spread the arms 17 apart from the arms 26, as best seen by reference to Figs. 2 and 3.

By reason of the fact that the surface of the arms 17 and 26 and bars 27 in contact with the tread 13a of the tire is a flat surface, as indicated at 37 for one of the arms 17 in Fig. 5, the tread of the tire will not be damaged by use of the invention.

The hereinbefore described invention, therefore, provides a non-skid chain structure for automotive vehicle tires which is simple in construction, not damaging to the tires, and effective in preventing skidding on icy pavements.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A tire chain comprising a plurality of link sections each including a substantially V-shaped element having reduced end portions, a substantially triangular shaped element including a bar having lugs thereon, means for pivotally connecting said elements including means extended through said lugs and said reduced end portions, said last named means including means for interconnecting said sections, and means for mounting said sections on a tire.

2. A tire chain comprising a plurality of link sections each including a substantially V-shaped element having reduced end portions, a substantially triangular shaped element including a bar having lugs thereon, means for pivotally connecting said elements including means extended through said lugs and said reduced end portions, said last named means including means for interconnecting said sections, a boss depending from the apex of each of said V-shaped elements, a boss depending from the apex of each of said elements directed toward the side wall of the tire, flexible members adapted to extend around the side walls of the tire when in operative position, and means for connecting said bosses to said flexible members.

3. A tire chain comprising a plurality of link sections each including a substantially V-shaped element having reduced end portions, a substantially triangular shaped element including a bar having lugs thereon, means for pivotally connecting said elements including means extended through said lugs and said reduced end portions, said last named means including means for interconnecting said sections, and means for mounting said sections on a tire, the sides of said V-shaped elements and said triangular shaped elements presenting a substantially flat surface to the tread of the tire.

4. A tire chain comprising a plurality of link sections each including a substantially V-shaped element having reduced end portions, a substantially triangular shaped element including a bar having lugs thereon, means for pivotally connecting said elements including means extended through said lugs and said reduced end portions, said last named means including means for interconnecting said sections, and means for mounting said sections on a tire, the sides of said V-shaped elements and said triangular shaped elements presenting a substantially flat surface to the tread of the tire, and the edges of said elements opposite said flat side being beveled.

5. A tire chain comprising a plurality of link sections each including a substantially V-shaped element having reduced end portions, a substantially triangular shaped element including a bar having lugs thereon, means for pivotally connecting said elements including means extended through said lugs and said reduced end portions, said last named means including means for interconnecting said sections, means for mounting said sections on a tire, the sides of said V-shaped elements and said triangular shaped elements presenting a substantially flat surface to the tread of the tire, the edges of said elements opposite said flat side being beveled, threaded recesses in said beveled edges, and calks detachably mounted in said recesses.

In testimony whereof I affix my signature.

AMIL L. DRAGER.